US012719092B2

(12) United States Patent
Lee et al.

(10) Patent No.: US 12,719,092 B2
(45) Date of Patent: Aug. 25, 2026

(54) BATTERY RACK MANAGEMENT APPARATUS

(71) Applicant: LG ENERGY SOLUTION, LTD., Seoul (KR)

(72) Inventors: Jung-Su Lee, Daejeon (KR); Sang-Yeon Kim, Daejeon (KR); Jung-Bin Jo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 665 days.

(21) Appl. No.: 17/797,592

(22) PCT Filed: Oct. 19, 2021

(86) PCT No.: PCT/KR2021/014628
§ 371 (c)(1),
(2) Date: Aug. 4, 2022

(87) PCT Pub. No.: WO2022/097967
PCT Pub. Date: May 12, 2022

(65) Prior Publication Data

US 2022/0407121 A1 Dec. 22, 2022

(30) Foreign Application Priority Data

Nov. 3, 2020 (KR) ........................ 10-2020-0145420
Oct. 14, 2021 (KR) ........................ 10-2021-0136968

(51) Int. Cl.
*H01M 10/42* (2006.01)
*H01M 50/204* (2021.01)
*H04L 61/3015* (2022.01)

(52) U.S. Cl.
CPC ..... *H01M 10/425* (2013.01); *H01M 10/4207* (2013.01); *H01M 50/204* (2021.01);
(Continued)

(58) Field of Classification Search
None
See application file for complete search history.

(56) References Cited

U.S. PATENT DOCUMENTS

2013/0108898 A1* 5/2013 Potts ................ H01M 10/4207 429/61
2013/0249492 A1 9/2013 Kim et al.
(Continued)

FOREIGN PATENT DOCUMENTS

CN 104428975 A 3/2015
CN 104981959 A 10/2015
(Continued)

OTHER PUBLICATIONS

Shawky et al., "Using Thermistors to Enhance Thermal Protection for Battery Management Systems", Texas Instruments Technical Document SNIA032, Aug. 2019 (Year: 2019).*
(Continued)

*Primary Examiner* — Anca Eoff
*Assistant Examiner* — James A Corno
(74) *Attorney, Agent, or Firm* — Morgan, Lewis & Bockius LLP

(57) ABSTRACT

Disclosed is a battery rack managing apparatus, which may effectively wake up a plurality of module BMSs. The battery rack managing apparatus manages a battery rack provided with a plurality of battery modules, and includes a plurality of module BMSs provided to correspond to one or more battery modules among the plurality of battery modules; a rack BMS configured to communicate with the plurality of module BMSs and control the plurality of module BMSs; a heater configured to generate and supply heat; and a plurality of wake-up units provided to correspond to the plurality of module BMSs, respectively, and including a variable resistor element configured to change a resistance value by the heat supplied by the heater, the plurality of wake-up units
(Continued)

being configured to supply a wake-up signal to a corresponding module BMS when the resistance value of the variable resistor element is changed.

20 Claims, 5 Drawing Sheets

(52) U.S. Cl.
CPC . *H04L 61/3015* (2013.01); *H01M 2010/4271* (2013.01); *H01M 2220/10* (2013.01)

(56) References Cited

U.S. PATENT DOCUMENTS

| | | | | |
|---|---|---|---|---|
| 2014/0210420 | A1* | 7/2014 | Lee | H01M 10/425 320/134 |
| 2014/0253046 | A1* | 9/2014 | Poznar | H01M 10/615 320/136 |
| 2015/0244192 | A1* | 8/2015 | Dauchy | H02J 7/61 320/152 |
| 2017/0187081 | A1 | 6/2017 | Kim et al. | |
| 2018/0253137 | A1 | 9/2018 | Cho et al. | |
| 2018/0269543 | A1* | 9/2018 | Kim | H01M 10/46 |
| 2019/0006724 | A1 | 1/2019 | Cho et al. | |
| 2019/0386496 | A1* | 12/2019 | Honda | B60L 58/18 |
| 2020/0031193 | A1 | 1/2020 | Lee et al. | |
| 2020/0052346 | A1 | 2/2020 | Park | |
| 2020/0144679 | A1 | 5/2020 | Kam et al. | |
| 2021/0119271 | A1* | 4/2021 | He | H02J 7/0031 |

FOREIGN PATENT DOCUMENTS

| | | | | |
|---|---|---|---|---|
| CN | 205488412 | U | 8/2016 | |
| CN | 108432030 | A | 8/2018 | |
| CN | 110574217 | A | 12/2019 | |
| JP | H11-6671 | A | 1/1999 | |
| JP | 2003-153435 | A | 5/2003 | |
| KR | 10-2013-0106782 | A | 9/2013 | |
| KR | 10-2014-0007080 | A | 1/2014 | |
| KR | 10-2015-0059247 | A | 6/2015 | |
| KR | 10-2015-0088239 | A | 7/2015 | |
| KR | 10-1561885 | B1 | 10/2015 | |
| KR | 10-2017-0025805 | A | 3/2017 | |
| KR | 10-2018-0018040 | A | 2/2018 | |
| KR | 10-2018-0113164 | A | 10/2018 | |
| KR | 10-1989492 | B1 | 6/2019 | |
| KR | 10-2005394 | A | 10/2019 | |
| KR | 10-2020-0052132 | A | 5/2020 | |
| WO | WO-2014106889 | A1 * | 7/2014 | B60L 3/0046 |
| WO | 2019/096049 | A1 | 5/2019 | |

OTHER PUBLICATIONS

Extended European Search Report issued Dec. 7, 2023 for European Patent Application No. 21889432.7 (Note: US 2019/0006724 A1 was cited in a prior IDS.).

International Search Report (with partial translation) and Written Opinion dated Feb. 4, 2022, for corresponding International Patent Application No. PCT/KR2021/014628.

Office Action dated Mar. 27, 2025, issued in corresponding Chinese Patent Application No. 202180012101.9. (Note: US 2014/0253046 A1, US 2018/0269543 A1, and WO 2014/106889 A1 cited in this CN Office Action have already been cited in PTO-892.).

Office Action dated Apr. 17, 2025 issued in corresponding Korean Patent Application No. 10-2021-0136968. (Note: US 2014/0253046 A1 cited in this KR Office Action have already been cited in PTO-892.).

* cited by examiner

BATTERY RACK MANAGEMENT APPARATUS

The present application claims priority to Korean Patent Application No. 10-2020-0145420 filed on Nov. 3, 2020 and Korean Patent Application No. 10-2021-0136968 filed on Oct. 14, 2021 in the Republic of Korea, the disclosures of which are incorporated herein by reference.

TECHNICAL FIELD

The present disclosure relates to a battery management technology and, more specifically, to a technology for managing a battery rack including a plurality of battery modules.

BACKGROUND ART

Recently, as the demand for portable electronic products such as notebook computers, video cameras, and mobile phones has rapidly increased and the commercialization of robots and electric vehicles has been accelerated, high-performance secondary batteries allowing repeated charging and discharging has been actively researched.

Currently commercialized secondary batteries include nickel-cadmium batteries, nickel-hydrogen batteries, nickel-zinc batteries, lithium secondary batteries, and the like. In particular, the lithium secondary batteries are spotlighted because they ensure free charging and discharging due to substantially no memory effect compared to nickel-based secondary batteries, as well as very low discharge rate and high energy density.

The secondary battery may be used alone, but in general, a plurality of secondary batteries are electrically connected to each other in series and/or in parallel in many cases. In particular, the plurality of secondary batteries may be accommodated in one module case in a state of being electrically connected to each other, thereby configuring one battery module. In addition, the battery module may be used alone, or two or more battery modules may be electrically connected to each other in series and/or parallel to configure a higher level device, such as a battery rack or a battery pack.

Recently, as issues such as power shortage or eco-friendly energy have been highlighted, an ESS (Energy Storage System) for storing generated power is receiving more attention. For example, as one of methods for regulating power supply and demand, a smart grid system has been proposed. The amount of electricity used by consumers is not always constant and may fluctuate at any time. For example, in the summer afternoon, the power consumption sharply increases due to the use of air conditioners, and then at night, the power consumption rapidly decreases. As described above, in terms of consuming power, power consumption is not constant and may fluctuate frequently, but in terms of supplying power, it is difficult to match the power consumption even if the power generation is adjusted to some extent. Accordingly, such an imbalance in power supply and consumption may cause an excess power supply or a shortage of power supply, and the smart grid system may flexibly store and adjust power to solve such a problem. The smart grid system may be regarded as a concept of storing power at the time or area where surplus power is generated, and supplying the stored power at the time or area where power shortage occurs. One of key components to build such a smart grid system may be an energy storage system for storing electricity. In the energy storage system, a large number of battery modules are typically present. In particular, a plurality of battery modules constitute one battery rack, and the energy storage system may be configured to include a plurality of battery racks. For example, the battery rack may be configured in a form where a plurality of battery modules are vertically stacked on a rack frame. In addition, the battery rack may be coupled with a BMS (Battery Management System) that controls the overall operation of the battery rack.

In particular, since the battery rack provided in the energy storage system or the like includes a plurality of battery modules, a battery management system of a multi-slave structure is mainly used in order to improve the efficiency of monitoring and controlling each battery module. The multi-slave structure is configured such that a plurality of slave BMSs or module BMSs take charge of a plurality of battery modules constituting the battery rack, respectively, and a master BMS or rack BMS integrally controls the plurality of module BMSs.

In the battery management system of a multi-slave structure, a wake-up configuration for the plurality of module BMSs may be required. That is, the module BMS of each battery module may be placed in a sleep mode for various reasons, such as reducing power consumption, transporting the battery module, repairing the battery rack, or replacing a specific battery module. For example, when replacing a specific battery module included in the battery rack, the module BMSs of all battery modules included in the battery rack may be changed to the sleep mode.

However, the module BMS placed in the sleep mode needs to be woken up at an appropriate time. For example, after replacing a specific battery module, the module BMSs of all battery modules included in the battery rack may be changed to a wake-up mode. Here, in order to wake up the module BMS, a wake-up signal may be supplied from the rack BMS. In addition, after each module BMS wakes up, an ID of each module BMS may be allocated by the rack BMS. In this case, the rack BMS usually uses a wired communication method to wake up the module BMS in many cases. However, since the wired communication method needs a separate communication line for wake-up, there is a problem in that the number of communication lines in the battery rack increases. Moreover, since a plurality of battery modules may be arranged in a narrow space in the battery rack applied to the energy storage system or the like, in this situation, the increase in communication cables may make it difficult to assemble, repair or arrange the battery rack. Also, a wireless communication method for wake-up may be proposed as a related art, but in this case, there is a problem that a specific communication module must be continuously turned on to receive a wireless signal for wake-up.

DISCLOSURE

Technical Problem

The present disclosure is designed to solve the problems of the related art, and therefore the present disclosure is directed to providing a battery rack managing apparatus, which may effectively wake up a plurality of module BMSs, and a battery rack and an energy storage system including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery rack managing apparatus, which manages a battery rack provided with a plurality of battery modules, the battery rack managing apparatus comprising: a plurality of module BMSs provided to correspond to one or more battery modules among the plurality of battery modules; a rack BMS configured to communicate with the plurality of module BMSs and control the plurality of module BMSs; a heater configured to generate and supply heat; and a plurality of wake-up units provided to correspond to the plurality of module BMSs, respectively, and including a variable resistor element configured to change a resistance value by the heat supplied by the heater, the plurality of wake-up units being configured to supply a wake-up signal to a corresponding module BMS when the resistance value of the variable resistor element is changed.

Here, the variable resistor element may be implemented with a PTC sensor.

In addition, the rack BMS may be configured to allocate an ID for a woken-up module BMS.

In addition, the variable resistor element may be configured to increase the resistance value when heat is applied thereto.

In addition, the wake-up unit may further include a wake-up power unit configured to generate a wake-up power for waking up the module BMS, and a wake-up path configured to provide a path for supplying the generated wake-up power to the module BMS.

In addition, the wake-up unit may further include a wake-up switching unit provided on the wake-up path and configured to change an on/off state according to the change in resistance of the variable resistor element.

In addition, the wake-up switching unit may be implemented with a FET.

In addition, the heater may include a rack heater operated under the control of the rack BMS, and a plurality of module heaters provided to correspond to the plurality of module BMSs, respectively.

In addition, the rack heater and the plurality of module heaters may be configured to apply heat to different variable resistor elements.

In addition, the plurality of module heaters may be configured to apply heat sequentially after the rack heater generate heat.

In addition, when being woken up, the module BMS may be configured to control such that a power is supplied to the corresponding module heater.

In another aspect of the present disclosure, there is also provided a battery rack, comprising the battery rack managing apparatus according to the present disclosure.

In still another aspect of the present disclosure, there is also provided an energy storage system, comprising the battery rack managing apparatus according to the present disclosure.

In still another aspect of the present disclosure, there is also provided a battery module, comprising: a module BMS configured to control a charging and discharging operation of the battery module; a heater configured to generate heat and supply the generated heat to another battery module; and a wake-up unit including a variable resistor element configured to change a resistance value by heat supplied by a heater of another battery module, the wake-up unit being configured to supply a wake-up signal to the module BMS when the resistance value of the variable resistor element is changed.

Advantageous Effects

According to an embodiment of the present disclosure, a plurality of module BMSs may be efficiently managed in terms of wake-up, ID allocation, or the like.

In particular, in terms of wake-up, in the present disclosure, a plurality of module BMSs may be wirelessly woken up, and thus it is possible to reduce or eliminate communication cables, compared to a wired wake-up method. In particular, since a large number of battery modules may be included in a narrow space in an energy storage system or the like, if the communication cables for wake-up are removed, it may be more advantageous to manufacture, secure space for, or repair the energy storage system.

In addition, according to an embodiment of the present disclosure, the rack BMS only needs to wake up some module BMS, for example only one module BMS, among the plurality of module BMSs, and the other module BMSs may automatically wake up without control of the rack BMS.

In addition, according to an embodiment of the present disclosure, even when a wake-up signal for a plurality of module BMSs is transmitted in a kind of wireless manner, a problem that which wake-up control is abnormally performed due to noise or the like may be prevented.

DESCRIPTION OF DRAWINGS

The accompanying drawings illustrate preferred embodiments of the present disclosure and together with the foregoing disclosure, serve to provide further understanding of the technical features of the present disclosure, and thus, the present disclosure is not construed as being limited to the drawing.

EMBODIMENTS

Hereinafter, preferred embodiments of the present disclosure will be described in detail with reference to the accompanying drawings. Prior to the description, it should be understood that the terms used in the specification and the appended claims should not be construed as limited to general and dictionary meanings, but should be interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
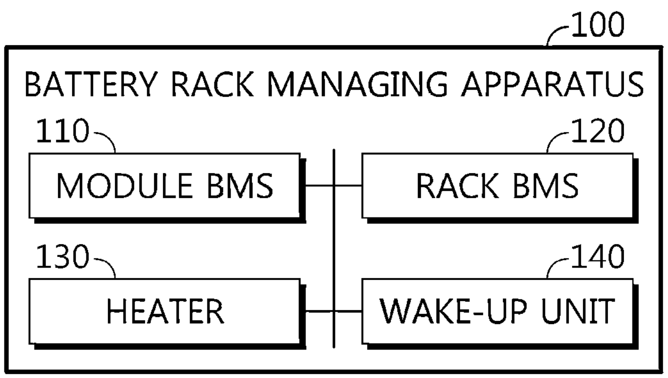
FIG. 1 is a block diagram schematically showing a functional configuration of a battery rack managing apparatus according to an embodiment of the present disclosure.
Figure 2:
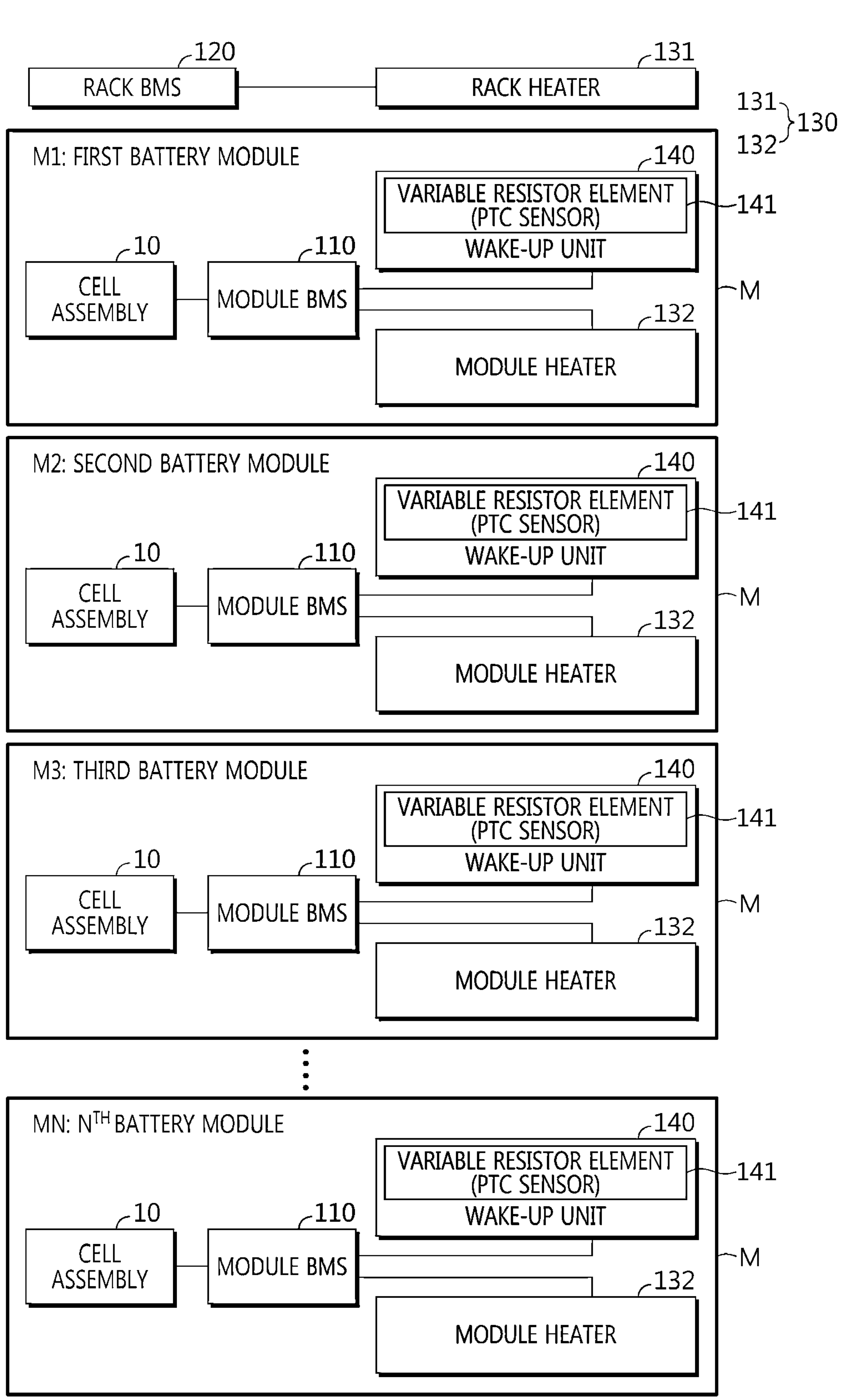
FIG. 2 is a diagram schematically showing a configuration in which the battery rack managing apparatus according to an embodiment of the present disclosure is applied to a battery rack.

FIG. 1 is a block diagram schematically showing a functional configuration of a battery rack managing apparatus 100 according to an embodiment of the present disclosure. Also, FIG. 2 is a diagram schematically showing a configuration in which the battery rack managing apparatus 100 according to an embodiment of the present disclosure is applied to a battery rack. In addition, FIG. 2 may be a diagram showing a partial configuration of the battery rack according to an embodiment of the present disclosure.

The battery rack managing apparatus 100 according to the present disclosure is a device for managing a battery rack provided with a plurality of battery modules M. Here, each battery module M may include a cell assembly 10. The cell assembly 10 includes at least one battery cell, particularly a plurality of battery cells. In addition, each battery cell may refer to a secondary battery that performs charging and discharging. In particular, when a plurality of battery cells are included in the cell assembly 10, the battery cells may be connected in series and/or in parallel to each other. The present disclosure is not limited to the specific configuration of the cell assembly 10 included in each battery module M, and various cell assemblies known at the time of filing of this application may be employed in the present disclosure.

Referring to FIGS. 1 and 2, the battery rack managing apparatus 100 according to the present disclosure may include a module BMS 110, a rack BMS 120, a heater 130, and a wake-up unit 140.

A plurality of module BMSs 110 may be included one battery rack. In addition, the module BMS 110 may be provided to correspond to one or more battery modules M among the plurality of battery modules M. In particular, the module BMS 110 may be provided to correspond to one battery module M. That is, the module BMS 110 may be separately provided for each battery module M, so that one module BMS 110 may be configured to manage one battery module M. For example, as shown in FIG. 2, when n battery modules M (a first battery module M1, a second battery module M2, . . . , an $N^{th}$ battery module MN) are included in the battery rack, n module BMSs 110 may also be provided and configured to manage different battery modules M.

Alternatively, the module BMS 110 may be provided to correspond to two or more battery modules M. In this case, one module BMS 110 may manage two or more different battery modules M. For example, one module BMS 110 may be configured to manage both the first battery module M1 and the second battery module M2.

The module BMS 110 may be configured to control the charging and discharging operation of the corresponding battery module M. Here, the corresponding battery module M may refer to a battery module M, whose charging and discharging operation is controlled by the corresponding module BMS 110. Moreover, the corresponding battery module M may be a battery module M to which the module BMS 110 is mounted or provided. For example, referring to FIG. 2, the module BMS 110 provided to the first battery module M1 may be configured to control the charging and discharging operation of the first battery module M1, and the module BMS 110 provided to the $N^{th}$ battery module MN may be configured to control the charging and discharging operation of the $N^{th}$ battery module MN.

The module BMS 110 may include a processor such as a MCU (Micro Controller Unit), a voltage sensor for measuring a voltage of the cell assembly 10, a current sensor for measuring a current, and the like. The module BMS 110 according to the present disclosure may employ various configurations or control operations such as a BMS (Battery Management System), the module BMS 110, a slave BMS, and a sub BMS, which are known at the time of filing of this application, and this will not be described in detail here.

The rack BMS 120 may be configured to communicate with the plurality of module BMSs 110. Accordingly, the rack BMS 120 may send and receive data to and from each module BMS 110. To this end, the rack BMS 120 may be connected to the module BMS 110 in a wired or wireless communication method. In particular, the rack BMS 120 may be configured to integrally control the plurality of module BMSs 110. For example, the rack BMS 120 may receive information such as voltage, current, temperature, SOC (State Of Charge), SOH (State Of Health), and the like of the corresponding battery module M from the module BMS 110. In addition, the rack BMS 120 may transmit a charging and discharging current, a charging and discharging voltage, and a signal for performing an operation such as balancing and switch on/off to each module BMS 110 based on the received information of each battery module M. The rack BMS 120 according to the present disclosure may employ various configurations or control operations of the BMS (Battery Management System), the rack BMS 120, the master BMS, the main BMS, or the like known at the time of filing of this application, which will not be described in detail here. The operation of integrally controlling the module BMSs 110 by the rack BMS 120 may be performed after the module BMS 110 wakes up, and further after an ID is allocated to each module BMS 110.

The heater 130 may be configured to generate and supply heat. As the heater 130, various heating elements or devices known at the time of filing of this application may be employed. As a representative example, the heater 130 may be implemented with a resistor element. Alternatively, the heater 130 may include various components such as an infrared light emitting element or a quartz tube. The power supplied to the heater 130 to operate the heater 130 may be a power normally supplied to an electric component such as a BMS in the battery rack or may be separately supplied from the cell assembly 10. For example, the operating power supplied to the heater 130 may be supplied from the cell assembly 10 and may be supplied via a separate voltage regulator.

The wake-up unit 140 may be provided to correspond to each of the plurality of module BMSs 110. For example, as shown in FIG. 2, when n module BMSs 110 are provided to correspond to the n number of battery modules M, respectively, an n number of wake-up units 140 may also be provided. That is, the wake-up unit 140 may be separately provided for each battery module M.

In particular, the wake-up unit 140 may include a variable resistor element. Here, the variable resistor element 141 may be a temperature-based variable resistor element configured to change a resistance value by heat. Moreover, in the wake-up unit 140 according to the present disclosure, the variable resistor element 141 may be configured to change a resistance value by the heat supplied by the heater 130. To this end, the wake-up unit 140 may be configured so that the variable resistor element 141 is be positioned in a direction in which heat is dissipated by the heater 130.

In particular, the variable resistor element 141 may be implemented with a PTC (Positive Temperature Coefficient) sensor. The PTC sensor may be a component whose resistance value is changed by heat. The PTC sensor may be an element whose resistance value increases as temperature increases. In this specification, a case in which a PTC sensor (PTC element) is used as the variable resistor element 141 will be mainly described. However, in addition to the PTC sensor, various other elements whose resistance changes according to temperature, for example a NTC (Negative Temperature Coefficient) element, may be used for the variable resistor element 141.

The wake-up unit 140 may be configured to supply a wake-up signal to the corresponding module BMS 110 when the resistance value of the PTC sensor, namely the variable resistor element 141, is changed. Here, the corresponding module BMS 110 may be a module BMS 110 included in the battery module M provided with the corresponding wake-up unit 140. In addition, by the wake-up signal, the corresponding module BMS 110 may be switched from a sleep mode to a wake-up mode.

For example, with reference to the configuration of FIG. 2, when the heat of the rack heater 131 is supplied to the PTC sensor 141 (a first PTC sensor) corresponding to the first battery module M1, the wake-up unit 140 (a first wake-up unit) corresponding to the first battery module M1 may be configured to supply a wake-up signal to the module BMS 110 (a first module BMS) of the first battery module M1. In this case, the first module BMS may wake up. In addition, when the heat of the rack heater 131 is supplied to the PTC sensor 141 (a second PTC sensor) corresponding to the second battery module M2, the wake-up unit 140 (a second wake-up unit) corresponding to the second battery module M2 may be configured to supply a wake-up signal to the module BMS 110 (a second module BMS) of the second battery module M2. In addition, by doing so, the second module BMS may wake up. In this way, both the module BMS 110 of the third battery module M3 and the module BMS 110 of the $N^{th}$ battery module MN may wake up.

According to this configuration of the present disclosure, the module BMS 110 provided to the plurality of battery modules M may be wirelessly wake up. That is, the heater 130 may supply heat to the PTC sensor 141 even at a location spaced apart from the PTC sensor 141 by a predetermined distance. Accordingly, as shown in FIG. 2, even if a separate communication cable is not connected to the wake-up unit 140 for waking up each battery module M, each module BMS 110 may wake up. Therefore, in this case, the configuration of the battery rack for waking up the module BMS 110 may be simplified, and the battery rack or the battery module M may be assembled more easily. Moreover, in this case, the work space inside the battery rack is secured, so that the battery rack may be repaired more easily.

The rack BMS 120 may be configured to allocate an ID for the module BMS 110. In particular, the rack BMS 120 may be configured to allocate an ID for the woken-up module BMS 110 when the module BMS 110 wakes up. Here, the ID may be information identifying a specific module BMS in the plurality of module BMSs 110 or information identifying a specific battery module in the plurality of battery modules M.

To this end, the rack BMS 120 may be configured to receive the information indicating wake-up from the module BMS 110. In particular, the module BMS 110 may be provided with a communication module, for example a wireless communication module, capable of communicating with the rack BMS 120. In addition, when the module BMS 110 wakes up, the wireless communication module may be usable. Accordingly, when the module BMS 110 wakes up, the module BMS 110 may transmit a wake-up signal to the rack BMS 120 through the wireless communication module. In addition, when the rack BMS 120 receives the wake-up information in this way, the rack BMS 120 may allocate an ID for the corresponding module BMS 110 and transmit the allocated ID to the corresponding module BMS 110.

For example, in the configuration shown in FIG. 2, when the module BMS 110 (the first module BMS) of the first battery module M1 wakes up, the first module BMS 110 may transmit the wake-up information to the rack BMS 120. Then, the rack BMS 120 may generate an ID for the first module BMS 110 and transmit the ID to the first module BMS 110. Also, even when the module BMSs 110 of the second to $N^{th}$ battery modules M2 to MN wake up, the rack BMS 120 may allocate and transmit an ID for the woken-up module BMS 110 in the same way.

The PTC sensor 141 of the wake-up unit 140 may be configured to increase a resistance value when heat is applied thereto. For example, the PTC sensor 141 may be configured such that the resistance value increases from 0Ω to 100 kΩ when heat of a specific temperature or above is applied. Accordingly, when the applied temperature, namely the ambient temperature, rises above a certain level, the PTC sensor 141 may stop a current from flowing to both ends. In addition, the wake-up unit 140 may be configured to supply a wake-up signal to the corresponding module BMS 110 due to such a current cut-off of the PTC sensor 141.

For example, in the case of the wake-up unit 140 provided to correspond to the first battery module M1, if the heat is applied to the PTC sensor 141 included therein so that the resistance of the PTC sensor 141 increases, the current of the PTC sensor 141 may be cut off. In addition, due to the current cut-off of the PTC sensor 141, the wake-up unit 140 may automatically transmit a wake-up signal to the module BMS 110 included in the same battery module, namely the first battery module M1.

According to this configuration of the present disclosure, the module BMS 110 may simply wake up by using the characteristics of the PTC sensor 141.

The wake-up unit 140 may include a wake-up power unit 142 and a wake-up path 143. This will be described in more detail with reference to FIG. 3.

Figure 3:
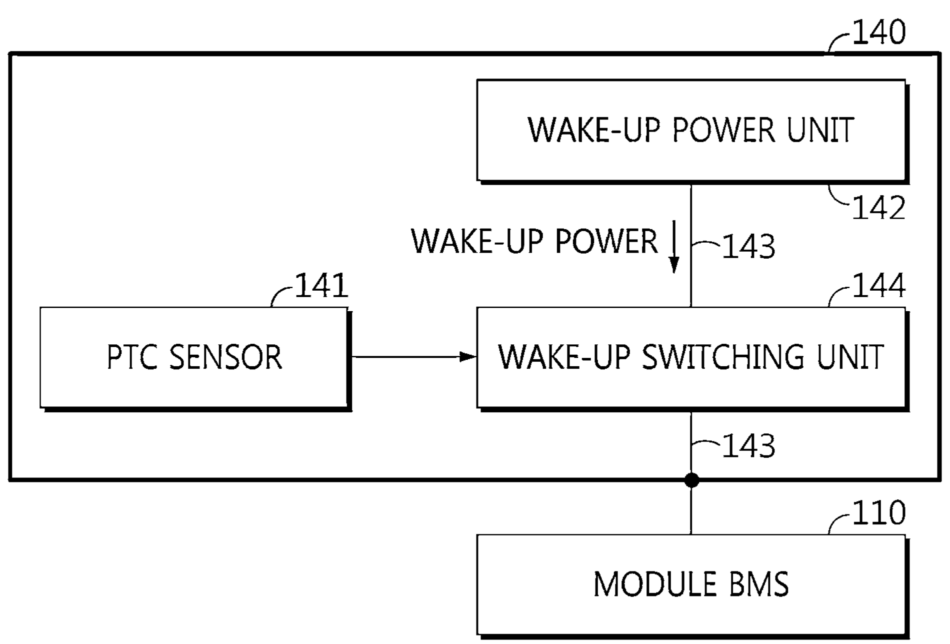
FIG. 3 is a block diagram schematically showing a configuration of a wake-up unit according to an embodiment of the present disclosure.

FIG. 3 is a block diagram schematically showing a configuration of the wake-up unit 140 according to an embodiment of the present disclosure.

Referring to FIG. 3, the wake-up unit 140 for applying a wake-up signal to the module BMS 110 may include a wake-up power unit 142 and a wake-up path 143.

The wake-up power unit 142 may be configured to generate a wake-up power to wake up the module BMS 110. That is, the wake-up power unit 142 may be configured to generate and apply a voltage of a magnitude capable of waking up the module BMS 110. For example, the wake-up power unit 142 may be configured to generate and supply 24V power.

The wake-up path 143 may be located between the wake-up power unit 142 and the module BMS 110, and may provide a path through which the power generated by the wake-up power unit 142 is supplied to the module BMS 110.

The wake-up path 143 may be implemented in various forms capable of supplying power, for example a cable, a printed circuit, a bus bar, or the like.

Figure 4:
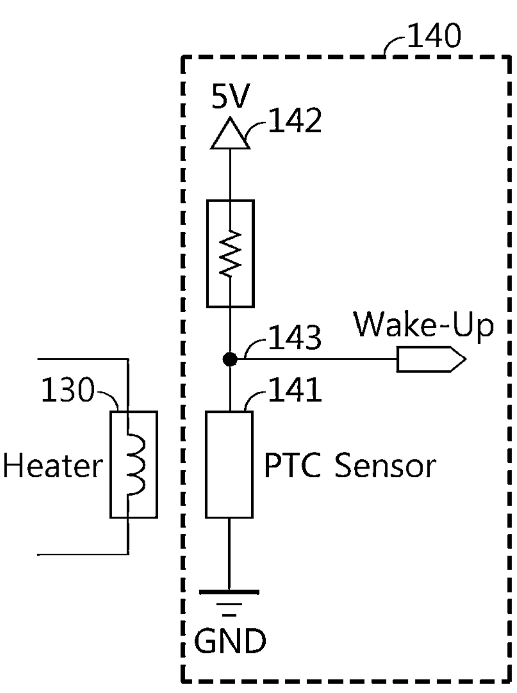
FIG. 4 is a diagram schematically showing a circuit configuration of the wake-up unit according to an embodiment of the present disclosure.

FIG. 4 is a diagram schematically showing a circuit configuration of the wake-up unit 140 according to an embodiment of the present disclosure.

Referring to FIG. 4, the wake-up power unit 142 may transmit a wake-up signal to an output terminal (displayed as 'Wake-Up') through the wake-up path 143. In addition, the output terminal may be connected to the module BMS 110. In FIG. 4, it is illustrated that 5V is supplied as a wake-up power, but the present disclosure is not limited to this voltage level. Also, one end of the PTC sensor 141 may be connected to a predetermined point of the wake-up path 143, particularly a portion connected to the wake-up power unit 142. In addition, the other end of the PTC sensor 141 may be connected to a ground GND. Meanwhile, the heater 130 illustrated in FIG. 4 may be a heater 130 positioned out of the corresponding battery module M, for example in another battery module M.

In addition, as shown in FIG. 4, the wake-up unit 140 may further include a pull-up resistor for limiting a current on a path to which power is supplied by the wake-up power unit 142, particularly before a branching location of the PTC sensor 141 and the wake-up path 143.

In the circuit configuration of the present disclosure as described above, in a state where the heater 130 does not apply heat to the PTC sensor 141, the PTC sensor 141 has almost no resistance, so the current by the wake-up power unit 142 does not flow to the wake-up signal output terminal but may flow toward the PTC sensor 141 entirely. Accordingly, in this case, the wake-up signal may not be transmitted from the wake-up unit 140 to the module BMS 110. However, if the heater 130 applies heat to the PTC sensor 141, the resistance of the PTC sensor 141 may increase significantly. In this case, the power by the wake-up power unit 142 may be supplied to the wake-up signal output terminal, rather than the PTC sensor 141. In this case, the module BMS 110 may be woken up by the wake-up signal supplied from the wake-up power unit 142.

According to this circuit configuration of the present disclosure, even with a simple circuit configuration, it may be determined whether or not to wake up the module BMS 110 according to the change in the resistance value of the PTC sensor 141. That is, according to the above configuration, since a wake-up power is automatically supplied to the module BMS 110 as long as heat is supplied to the PTC sensor 141, there is no need to include a separate communication module or processor for supplying the wake-up signal. In particular, according to the above configuration, the specific communication module does not need to continuously maintain a turn-on state in order to receive the wake-up signal.

Figure 5:
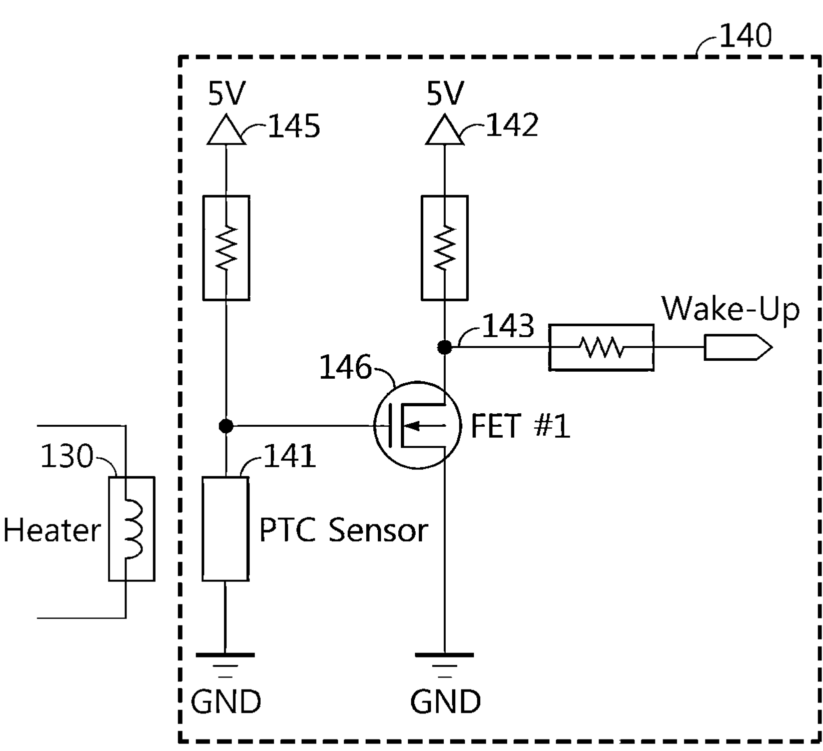
FIG. 5 is a diagram schematically showing a circuit configuration of a wake-up unit according to another embodiment of the present disclosure.

FIG. 5 is a diagram schematically showing a circuit configuration of a wake-up unit 140 according to another embodiment of the present disclosure. In FIG. 5, features different from those of the above embodiment, particularly the embodiment of FIG. 4, will be described in detail, and features identical or similar to those of the above embodiment will not be described in detail.

Referring to FIG. 5, similarly to FIG. 4, the wake-up power unit 142 may transmit a wake-up signal to the output terminal (displayed as 'Wake-Up') through the wake-up path 143. In particular, in this embodiment, the wake-up unit 140 may further include a driving switching unit 146. The driving switching unit 146 may be positioned between the wake-up path 143 and the ground GND. Here, the driving switching unit 146 may be implemented with a FET (Field Effect Transistor), particularly an N-channel FET. In addition, a drain terminal and a source terminal of the driving switching unit 146 may be connected to the wake-up path 143 and the ground GND. Also, a gate terminal of the driving switching unit 146 may be connected to the PTC sensor 141. In addition, the driving power unit 145 may be connected to a path between the PTC sensor 141 and the gate terminal of the driving switching unit 146. Here, the driving power unit 145 is also illustrated as supplying 5V, but the present disclosure is not limited to this voltage level.

In addition, in this embodiment, in addition to the wake-up power unit 142, as shown in FIG. 5, a pull-up resistor for limiting a current may be further provided to the wake-up path 143 and the driving power unit 145.

In the circuit configuration of the present disclosure as described above, in a state where the heater 130 does not apply heat to the PTC sensor 141, the resistance of the PTC sensor 141 will be close to 0Ω, so no voltage may be applied to the gate terminal of the driving switching unit 146, or a low voltage close to 0V may be applied. Accordingly, the driving switching unit 146 is maintained in a turn-off state, and the power by the wake-up power unit 142 may be supplied to the wake-up signal output terminal. Therefore, in this case, the wake-up signal may be transmitted from the wake-up unit 140 to the module BMS 110.

However, if the heater 130 applies heat to the PTC sensor 141, the resistance of the PTC sensor 141 increases, and in this case, the voltage at both ends of the PTC sensor 141 may increase. Accordingly, a voltage of a certain level or more may be applied to the gate terminal of the driving switching unit 146. In addition, due to this, the driving switching unit 146 may be turned on. In particular, the driving switching unit 146 may be implemented with an N-channel FET. In this case, if the voltage between the gate terminal and the source terminal of the driving switching unit 146 increases to a certain level or more, the driving switching unit 146 may be turned on. As such, if the driving switching unit 146 is turned on as above, the wake-up power supplied by the wake-up power unit 142 may be configured to flow to the driving switching unit 146, rather than the wake-up signal output terminal. In particular, since the pull-up resistor is present at the wake-up signal output terminal, when the driving switching unit 146 is turned on, the current by the wake-up power unit 142 may not flow to the wake-up signal output terminal but flow to the ground GND via the driving switching unit 146. Accordingly, in this case, the module BMS 110 does not receive a wake-up signal.

According to this circuit configuration of the present disclosure, unlike the embodiment of FIG. 4 above, the module BMS 110 may not wake up when the heater 130 operates, and the module BMS 110 may wake up when the heater 130 does not operate. In particular, in this embodiment, whether or not to transmit the wake-up signal may be reliably determined by turning on or off the driving switching unit 146. Accordingly, when the resistance value of the PTC sensor 141 is in a floating region, it is possible to prevent the wake-up unit 140 from malfunctioning. In particular, according to the above embodiment, even in a situation where the resistance value of the PTC sensor 141 is not reliably increased, the magnitude of the wake-up signal is maintained constant, so that the module BMS 110 may be woken up more clearly.

In addition, the wake-up unit 140 according to the present disclosure may further include a wake-up switching unit 144 as shown in FIG. 3.

The wake-up switching unit 144 may be provided on the wake-up path 143 and configured to open and close the wake-up path 143. That is, when the wake-up switching unit 144 is turned on, the wake-up path 143 may be connected, and when the wake-up switching unit 144 is turned off, the wake-up path 143 may be blocked. Also, the wake-up switching unit 144 may be configured to change an on/off state by the change in resistance of the PTC sensor 141. In particular, when the resistance of the PTC sensor 141 increases, the wake-up unit 140 may be configured such that the wake-up switching unit 144 is turned on and a wake-up signal flows to the wake-up path 143. This will be described in more detail with reference to FIG. 6.

Figure 6:
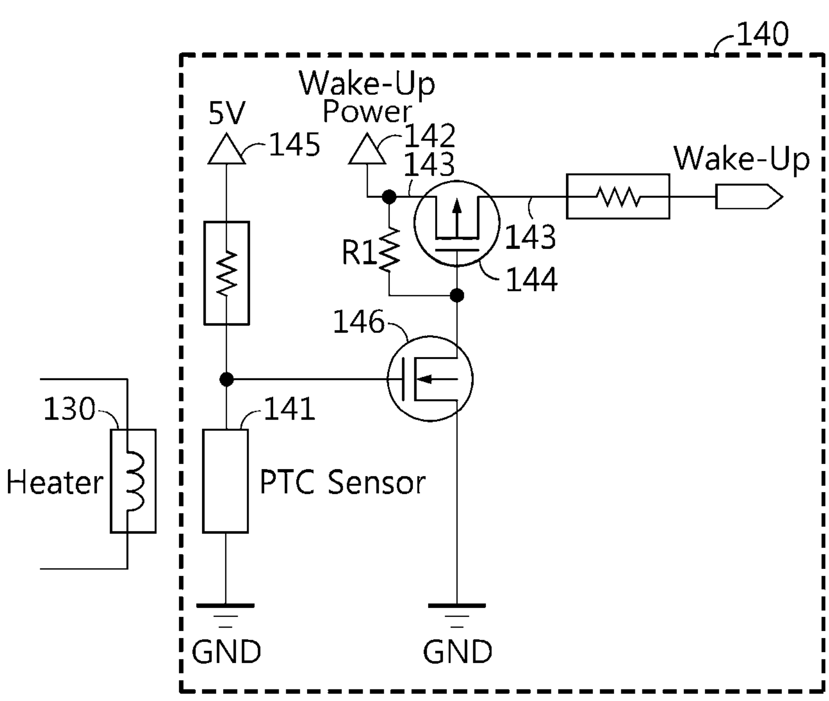
FIG. 6 is a diagram schematically showing a circuit configuration of a wake-up unit according to still another embodiment of the present disclosure.

FIG. 6 is a diagram schematically showing a circuit configuration of a wake-up unit 140 according to still another embodiment of the present disclosure.

Referring to FIG. 6, the wake-up power unit 142 as indicated by 'Wake Up Power' may transmit a wake-up signal to the module BMS 110 through the wake-up path 143. In addition, the wake-up path 143 includes the wake-up switching unit 144.

Here, the wake-up switching unit 144 may be implemented with a FET (Field Effect Transistor) as shown in FIG. 6. In particular, the wake-up switching unit 144 may be implemented with a P-channel FET. In this case, the source terminal and the drain terminal of the wake-up switching unit 144 may be connected to the wake-up power unit 142 and the module BMS 110, respectively. In addition, the gate terminal of the wake-up switching unit 144 may be connected to the ground GND. In this case, the driving switching unit 146, which is another switching element, may be provided between the wake-up switching unit 144 and the ground GND. Also, between the source terminal and the gate terminal of the wake-up switching unit 144, a resistor element may be connected as indicated by R1 in the drawing. That is, the resistor element R1 may be regarded as being connected in parallel to the source terminal and the gate terminal of the wake-up switching unit 144. In addition, one end of the resistor element R1 may be connected to the wake-up power unit 142, and the other end of the resistor element R1 may be directly connected to the driving switching unit 146.

The driving switching unit 146 may be implemented with a FET, particularly an N-channel FET. In this case, the drain terminal and the source terminal of the driving switching unit 146 may be connected to a path between the wake-up switching unit 144 and the ground GND. In addition, the gate terminal of the driving switching unit 146 may be connected to the PTC sensor 141. In this case, the other terminal of the PTC sensor 141 not connected to the driving switching unit 146 may be directly connected to the ground GND.

In addition, the gate terminal of the driving switching unit 146 may be connected not only to the PTC sensor 141 but also to the driving power unit 145. That is, the driving power unit 145 may be connected to a path between the driving switching unit 146 and the PTC sensor 141. The driving power unit 145 may be configured to supply 5V power as shown in FIG. 6, but this is only an example, and it is also possible to supply voltages of different magnitudes.

Meanwhile, as shown in FIG. 6, the wake-up unit 140 may further include a pull-up resistor to limit a current on the path to which power is supplied by the driving power unit 145, particularly before the connection point between the PTC sensor 141 and the driving switching unit 146. In addition, as shown in FIG. 6, the wake-up unit 140 may further include a pull-up resistor to limit a current on the wake-up path 143, particularly between the wake-up switching unit 144 and the module BMS 110.

In the circuit configuration of the present disclosure as described above, since the PTC sensor 141 has almost no resistance when the heater 130 does not apply heat to the PTC sensor 141, almost no voltage may be applied to the gate terminal of the driving switching unit 146. Accordingly, in this case, the driving switching unit 146 may be maintained in the turn-off state. In addition, in a state where the driving switching unit 146 is turned off, there is almost no voltage difference between the source terminal and the gate terminal of the wake-up switching unit 144. Accordingly, the wake-up switching unit 144 may be maintained in the turn-off state, and the wake-up signal by the wake-up power unit 142 may not be supplied to the module BMS 110.

Meanwhile, if the heater 130 applies heat to the PTC sensor 141, the resistance of the PTC sensor 141 may increase. In this case, the voltage at both ends of the PTC sensor 141 may increase due to the power of the driving power unit 145. Accordingly, a high voltage of a predetermined level or more may be input to the gate terminal of the driving switching unit 146, so that the driving switching unit 146 may be turned on. In this case, the voltage between the gate terminal and the source terminal of the wake-up switching unit 144 may be varied. In particular, when the driving switching unit 146 is turned on, the current by the wake-up power unit 142 may flow through the resistor R1, so that the voltage of the source terminal of the wake-up switching unit 144 may become greater than the voltage of the gate terminal. In this case, when the wake-up switching unit 144 is a P-channel FET, a reverse voltage smaller than 0 V is applied between the gate terminal and the source terminal, so that the wake-up switching unit 144 may be turned on. Accordingly, the wake-up signal by the wake-up power unit 142 may be supplied to the module BMS 110 through the wake-up switching unit 144.

According to this circuit configuration of the present disclosure, the wake-up switching unit 144 may be controlled to turn on/off according to the change in the resistance value of the PTC sensor 141. Moreover, in the above embodiment, the module BMS 110 may wake up when the heater 130 applies heat, and the module BMS 110 may not wake up when the heater 130 does not apply heat. That is, in the above embodiment, not only the module BMS 110 may be automatically controlled to wake up by supplying heat to the PTC sensor 141, but also the heater 130 may be operated only when it is intended to wake up the module BMS 110. Moreover, according to the above embodiment, there may be an advantage of raising the wake-up power voltage to a maximum voltage between the source terminal and the drain terminal of the driving switching unit 146.

Meanwhile, in this specification, a FET is employed as a specific example of the wake-up switching unit 144 or the driving switching unit 146, but the present disclosure is not necessarily limited to this type of switch. That is, other various switching elements known at the time of filing of this application may be employed as the wake-up switching unit 144 or the driving switching unit 146 of the present disclosure.

As shown in FIG. 2, the heater 130 may include a rack heater 131 and a module heater 132.

Here, the rack heater 131 may be operated under the control of the rack BMS 120. That is, the rack BMS 120 may be configured to turn on and off the rack heater 131. For example, the rack BMS 120 may control the operation of the rack heater 131 by turning on/off a switch on the path through which a driving power is supplied to the rack heater

131. The power supplied to the rack heater 131 may be supplied from the cell assembly 110 or a separate auxiliary battery provided in the battery rack.

Meanwhile, the rack heater 131 may not be provided in a shape corresponding to a specific battery module M. For example, as shown in FIG. 2, the rack heater 131 may not be provided in any battery module M among the plurality of battery modules M, but may be separately provided outside the battery modules M. In particular, one rack heater 131 may be provided in the battery rack. Moreover, the rack heater 131 may be installed at a predetermined position to apply heat to the PTC sensor 141 of a specific battery module M. For example, in a battery rack in which a plurality of battery modules M are stacked in a vertical direction, the rack heater 131 may be disposed in a position and shape capable of applying heat to the PTC sensor 141 of the battery module M stacked at the top.

The module heater 132 may be provided to correspond to each of the plurality of module BMSs 110. That is, a plurality of module heaters 132 may be provided for different module BMS 110, individually. For example, as shown in FIG. 2, when the module BMS 110 is separately present for each of the plurality of battery modules M, the module heater 132 may also be separately present for each of the plurality of battery modules M. In this case, if an n number of module BMSs 110 are present, an n number of module heaters 132 may also be present.

However, it is also possible that the module heater 132 is not present for any one of the modules BMS 110. For example, in the configuration of FIG. 2, the module heater 132 of the $N^{th}$ battery module MN may not be required because the PTC sensor 141 of another battery module to which heat is to be applied does not exist. However, if the module heater 132 is also present for the $N^{th}$ battery module MN, the module heater 132 may be used when another battery module, for example an $(N+1)^{th}$ battery module, is added. Therefore, if the module heater 132 exists separately for every battery module, it may be advantageous in terms of additional expandability of the battery module.

The module heater 132 may be configured to apply heat to another battery module M. In particular, the module heater 132 may be configured in a position and shape to allow heat to be applied to the PTC sensor 141 of another battery module M. In addition, the power supplied to the module heater 132 may be supplied from the cell assembly 110 in the corresponding battery module M or a separate auxiliary battery provided in the battery module M.

In particular, the module heater 132 may be configured to apply heat after the corresponding module BMS 110 wakes up. For example, seeing the configuration shown in FIG. 2, the module heater 132 of the first battery module M1 may be configured to operate to generate heat after the module BMS 110 of the first battery module M1 wakes up. In addition, the module heater 132 of the second battery module M2 may be configured to operate to generate heat after the module BMS 110 of the second battery module M2 wakes up.

According to this configuration of the present disclosure, by securing a predetermined time difference between wake-up times of the module BMSs 110, it is possible to prevent the communication between the rack BMS 120 and the module BMS 110 or the ID allocation and transmission of the rack BMS 120 from being duplicated.

In the above embodiment, the rack heater 131 and the plurality of module heaters 132 may be configured to apply heat to different PTC sensors 141. That is, the rack heater 131 and the module heaters 132 may be configured such that the PTC sensors 141 to which heat is applied do not overlap each other.

For example, in the configuration shown in FIG. 2, the rack heater 131 may be configured to apply heat to the PTC sensor 141 of the first battery module M1, and the other module heaters 132 may be configured not to apply heat to the PTC sensor 141 of the first battery module M1. Moreover, the module heater 132 of the first battery module M1 may be configured to apply heat to the PTC sensor 141 of the second battery module M2, and the module heater 132 of the second battery module M2 may be configured to apply heat to the PTC sensor 141 of the third battery module M3.

That is, the heaters 130 may be configured to apply heat to a specific PTC sensor 141 in a one-to-one relationship with each other. However, as described above, when the number of heaters 130 is larger than the number of PTC sensors 141, the PTC sensor 141 to which heat is applied may not exist for some heaters 130.

According to this configuration of the present disclosure, since a corresponding heater 130 for applying heat is determined for each PTC sensor 141, the wake-up or communication for the plurality of module BMSs 110 may not be overlapped but be performed more smoothly. Moreover, according to this configuration of the present disclosure, the wake-up sequence may be set more easily for the plurality of module BMSs 110.

Meanwhile, in the above embodiment, among several heaters 130, the rack heater 131 may be configured to generate heat first. In addition, the plurality of module heaters 132 may be configured to apply heat after the rack heater 131 generates heat. In addition, the plurality of module heaters 132 may be configured to sequentially generate and apply heat without applying heat at the same time.

According to this configuration of the present disclosure, the plurality of module BMSs 110 may be woken up sequentially. Accordingly, subsequent procedures for the plurality of module BMSs 110, such as ID allocation and transmission, may be sequentially performed. Moreover, according to the above embodiment, since ID allocation is performed from a module BMS closer to the rack heater 131, ID allocation may be predicted.

For example, seeing the configuration of FIG. 2, if the rack heater 131 generates heat under the control of the rack BMS 120, the PTC sensor 141 of the first battery module M1 may receive heat to change the resistance value, and thus the Module BMS 110 of first battery module M1 may wake up. In addition, if the module heater 132 of the first battery module M1 generates heat, the heat may be transferred to the PTC sensor 141 of the second battery module M2, and the module BMS 110 of the second battery module M2 may wake up. In addition, since heat is continuously generated in each module heater 132 in this way, the module BMS 110 of each battery module may be sequentially woken up.

Also, in the above embodiment, the module BMS 110 may be configured to supply power to the corresponding module heater 132 when being woken up. That is, the module heater 132 is controlled by the module BMS 110, and in particular, the module heater 132 may be configured to operate when the module BMS 110 wakes up.

For example, in the configuration of FIG. 2, if the module BMS 110 of the first battery module M1 wakes up, heat may be applied from the module heater 132 of the first battery module M1. In addition, if the module BMS 110 of the second battery module M2 wakes up due to this, the module BMS 110 of the second battery module M2 may be configured such that heat is applied from the module heater 132 of the second battery module M2.

Here, the module BMS 110 may control the module heater 132 in various ways. For example, the module BMS 110 may control the operation of the module heater 132 by turning on/off a switch on the path through which an operating power is supplied to the module heater 132.

The module heater 132 may be configured to generate heat after an ID is allocated for the module BMS 110 of the corresponding battery module M. For example, in the configuration of FIG. 2, the module heater 132 of the first battery module M1 may be configured to apply heat after the module BMS 110 of the first battery module M1 receives the ID from the rack BMS 120.

According to this configuration of the present disclosure, since ID allocation may be performed sequentially, ID allocation of the rack BMS 120 may be made more easily. In particular, in this case, because the rack BMS 120 does not simultaneously receive ID allocation requests for several module BMSs 110, ID allocation and transmission may be handled more smoothly. In addition, according to this configuration of the present disclosure, the wake-up speed by each module BMS 110 may be controlled.

The wake-up unit 140 may be configured to automatically turn on the module heater 132 when a wake-up signal is supplied. In particular, the wake-up unit 140 may be configured such that the module heater 132 generates heat without being controlled by the module BMS 110. This will be described in more detail with reference to FIG. 7.

Figure 7:
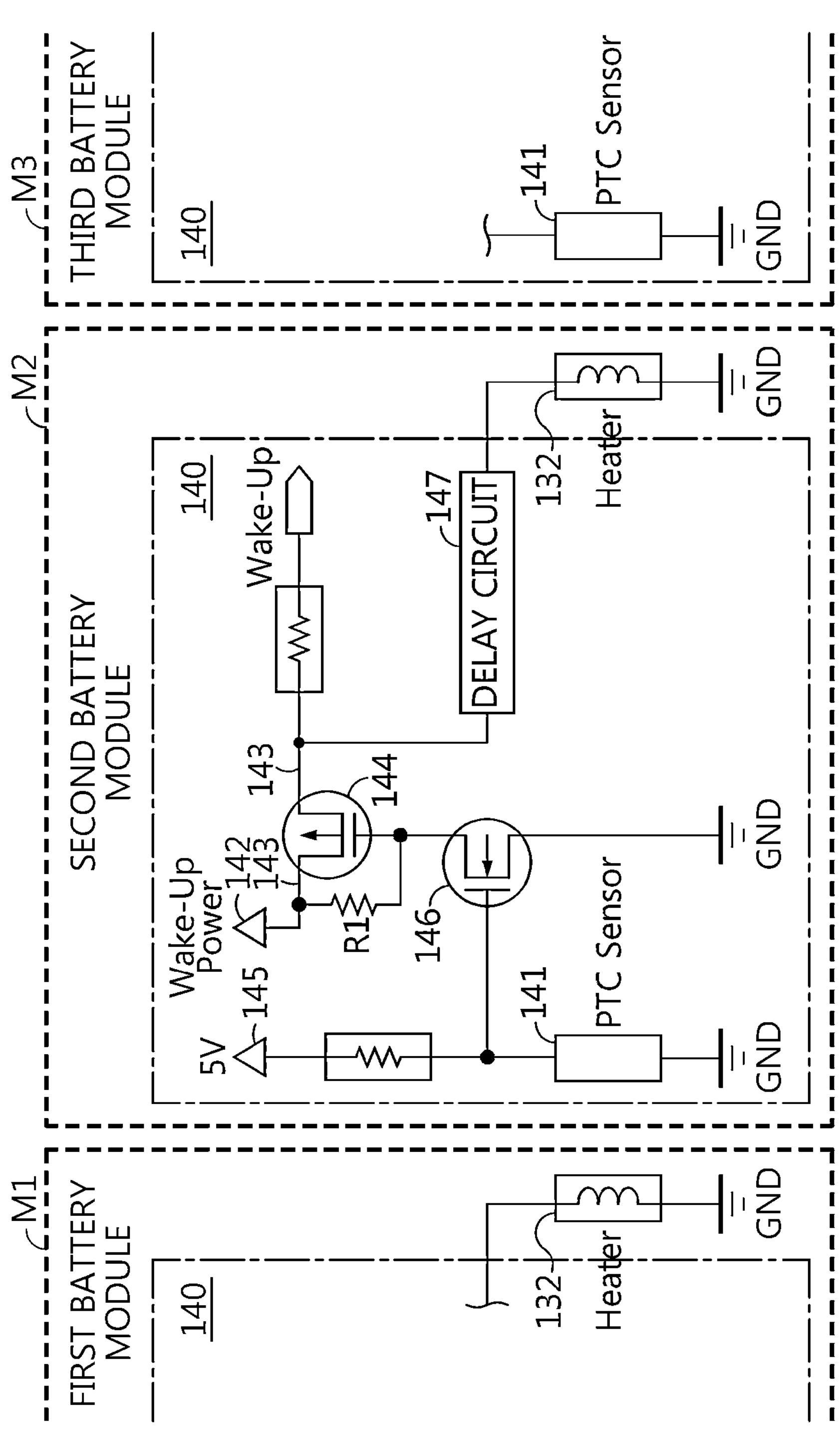
FIG. 7 is a diagram schematically showing a circuit configuration of a wake-up unit according to still another embodiment of the present disclosure.

FIG. 7 is a diagram schematically showing a circuit configuration of a wake-up unit 140 according to still another embodiment of the present disclosure. In this embodiment, features different from those of the above embodiments, particularly the embodiment of FIG. 6, will be described in detail, and features identical or similar to those of the above embodiments will not be described in detail.

Referring to FIG. 7, a configuration in which three battery modules M, namely first to third battery modules M1 to M3, are sequentially positioned adjacent to each other is disclosed. Here, each of the battery modules M may include both the module heater 132 and the wake-up unit 140, but for convenience of explanation, it is illustrated that both the module heater 132 and the wake-up unit 140 are included only in the second battery module M2 located at the center. In addition, only the module heater 132 is shown for the first battery module M1, and only the PTC sensor 141 is shown for the third battery module M3.

In the configuration of FIG. 7, in the second battery module M2, the wake-up unit 140 may be configured similar to that of FIG. 6. However, in the embodiment of FIG. 7, the module heater 132 is configured to be directly connected to the corresponding wake-up unit 140. In addition, the module heater 132 may be configured to receive a current from the corresponding wake-up unit 140 to generate heat. For example, the module heater 132 of the second battery module M2 may be connected to the wake-up unit 140 of the second battery module M2 and configured to receive an operating power from the second battery module M2.

In particular, the module heater 132 may be directly or indirectly connected to the wake-up path 143 of the wake-up unit 140. Moreover, the module heater 132 may be connected between the wake-up switching unit 144 and the wake-up signal output terminal (displayed as 'Wake-Up') on the wake-up path 143, as shown in FIG. 7.

According to this configuration of the present disclosure, in order to operate the module heater 132 of each battery module M, it is not required to separately control the module BMS 110 or the like. That is, if a wake-up signal is transmitted to the module BMS 110 by the wake-up unit 140, the module heater 132 included in the same battery module M may automatically generate heat.

This operation will be described in more detail based on FIG. 7. First, the resistance of the PTC sensor 141 of the second battery module M2 may increase due to the heat generated by the module heater 132 of the first battery module M1. In addition, in this case, the wake-up switching unit 144 of the second battery module M2 may be turned on and the wake-up signal may be transmitted to the module BMS 110 of the second battery module M2, so that the module BMS 110 of the second battery module M2 may wake up. At this time, the wake-up path 143 of the second battery module M2 is connected to a path through which an operating power is supplied to the module heater 132 of the second battery module M2. Therefore, if the wake-up path 143 of the second battery module M2 is connected so that a current flows, the current may not only flow into the module BMS 110 of the second battery module M2 as a wake-up signal, but also flow to the module heater 132 of the second battery module M2 as an operating power. Accordingly, in this case, the module BMS 110 of the second battery module M2 may wake up and the module heater 132 may generate heat simultaneously.

In addition, if the module heater 132 of the second battery module M2 generates heat as described above, the resistance value of the PTC sensor 141 of the third battery module M3 may increase. Also, due to this, the wake-up process and the heating process similar to the wake-up process of the second battery module M2 and the heating process of the module heater 132 may be performed in the third battery module M3 as well.

According to the above embodiment, when the module BMS 110 of the corresponding battery module M wakes up, the module heater 132 of the corresponding battery module M may also be automatically operated. Therefore, the woken-up module BMS 110 or the like does not need to perform a separate control operation for waking up another module BMS 110 by operating the module heater 132.

Meanwhile, as shown in FIG. 7, when a pull-up resistor exists at the rear end of the wake-up switching unit 144, namely at the wake-up signal output terminal, in the wake-up path 143 of the wake-up unit 140, the module heater 132 may be connected to a point between the wake-up switching unit 144 and the pull-up resistor. According to this configuration, a power without a voltage drop by the pull-up resistor may be supplied to the module heater 132. Therefore, a power of a sufficient magnitude may be supplied to the module heater 132, so that the module heater 132 may operate more smoothly.

In addition, in the embodiment in which the module heater 132 is supplied with a power from the wake-up unit 140 as described above, a delay circuit 147 may be provided at an input terminal of the module heater 132. For example, referring to FIG. 7, the wake-up unit 140 may include a path for supplying an operating power to the module heater 132, and the delay circuit 147 may be provided on the corresponding path. The delay circuit 147 may be configured to delay time when an operating power is supplied from the wake-up unit 140 to the module heater 132. As the delay circuit 147, various delay circuits known at the time of filing of this application may be employed.

According to this configuration of the present disclosure, after a predetermined time passes from when the module BMS 110 wakes up by the wake-up unit 140, the operating power may be supplied from the wake-up unit 140 to the module heater 132. Moreover, the module BMS 110 may be allocated with an ID from the rack BMS 120 after being woken up. At this time, according to the above embodiment, it is possible to secure a certain time for the module BMS 110 to be allocated with the ID as above. For example, in the second battery module M2, the module heater 132 may generate heat after a predetermined time passes from when the module BMS 110 is woken up by the wake-up unit 140. In addition, the module BMS 110 of the third battery module M3 may wake up due to the generated heat. Accordingly, it is possible to secure a wake-up time difference between the second battery module M2 and the third battery module M3. In addition, when the rack BMS 120 allocates the ID of the woken-up module BMS 110, the ID allocation and transmission may not be performed simultaneously but be performed sequentially for the module BMSs 110. Therefore, the ID allocation process of the rack BMS 120 may be performed more smoothly.

Meanwhile, the above various embodiments have been described based on the case where one PTC sensor 141 corresponds to one rack heater 131, but two or more PTC sensors 141 may also correspond to one rack heater 131.

The battery rack according to the present disclosure may include the battery rack managing apparatus 100 according to the present disclosure. In addition, the battery rack according to the present disclosure may further include components commonly included in a battery rack, in addition to the battery rack managing apparatus 100. For example, the battery rack according to the present disclosure may further include a rack frame for accommodating the cell assembly 10, the battery module M, or several BMSs 110, 120, and the like.

In addition, an energy storage system (ESS) according to the present disclosure may include the battery rack managing apparatus 100 according to the present disclosure. For example, the energy storage system according to the present disclosure may include one or more battery racks including the battery rack managing apparatus 100 according to the present disclosure.

In addition, the battery module M according to the present disclosure may be configured to include at least some components of the battery rack managing apparatus according to the present disclosure.

In particular, the battery module M according to the present disclosure may be configured to include the module BMS 110, the heater 130, and the wake-up unit 140, as shown in FIG. 2. Here, the module BMS 110 may be configured to control the charging and discharging operation of the battery module M. Also, the heater 130 may be configured to generate heat and supply the heat to another battery module M. In particular, the heater 130 may be configured to apply heat to the PTC sensor 141 of another battery module M. In addition, the wake-up unit 140 may include a PTC sensor 141, namely a variable resistor element, configured to change a resistance value by heat, particularly the heat supplied by a heater 130 of another battery module M. In addition, the wake-up unit 140 may be configured to supply a wake-up signal to the module BMS 110 according to the change in the resistance value of the PTC sensor 141.

The module BMS 110, the heater 130, and the wake-up unit 140 have been described in detail above, and thus will not be described in detail here.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

REFERENCE SIGNS

100: battery rack managing apparatus
110: module BMS
120: rack BMS
130: heater
131: rack heater, 132: module heater
140: wake-up unit
141: variable resistor element (PTC sensor), 142: wake-up power unit, 143: wake-up path, 144: wake-up switching unit, 145: driving power unit, 146: driving switching unit, 147: delay circuit
M: battery module
10: cell assembly

What is claimed is:

1. A battery rack managing apparatus for managing a battery rack having a plurality of battery modules, the battery rack managing apparatus comprising:

a plurality of module battery management systems (BMSs), each corresponding to one or more battery modules among the plurality of battery modules;

a rack BMS configured to communicate with the plurality of module BMSs and to control the plurality of module BMSs;

a heater configured to generate and supply heat; and a plurality of wake-up circuits respectively corresponding to the plurality of module BMSs, each of the plurality of wake-up circuits including a variable resistor element configured to change a resistance value by heat, and each of the plurality of wake-up circuits being configured to supply a wake-up signal to a corresponding one of the plurality of module BMSs if the resistance value of the variable resistor element is changed, wherein:

the heater includes a rack heater and a plurality of module heaters configured to apply heat to the variable resistor elements of the plurality of wake-up circuits; and the plurality of module heaters are different from battery cells, wherein at least one of the plurality of wake-up circuits (wake-up circuit) further includes a wake-up power circuit configured to generate a wake-up power for waking up a corresponding module BMS, wherein based on an amount of current supplied by the wake-up circuit to the variable resistor element of the wake-up circuit, the wake-up circuit is configured to automatically supply the wake-up power from the wake-up power circuit to the corresponding module BMS, without using a processor, wherein each battery module comprises a respective module BMS, a respective wake-up circuit, and a respective module heater, wherein the wake-up circuit includes a wake-up path for supplying the generated wake-up power to the corresponding module BMS, wherein the wake-up circuit includes a transistor connected to the wake-up path, wherein the wake-up circuit includes a corresponding module heater that is not located within the wake-up path, that is connected to an output of the transistor, and that is not connected to an input of the transistor, and wherein the transistor is not a temperature sensor.

2. The battery rack managing apparatus according to claim 1, wherein the variable resistor element is implemented with a PTC sensor.

3. The battery rack managing apparatus according to claim 1, wherein the rack BMS is configured to allocate an ID for a woken-up module BMS among the plurality of module BMSs.

4. The battery rack managing apparatus according to claim 1, wherein the variable resistor element is configured to increase the resistance value if heat is applied thereto.

5. The battery rack managing apparatus according to claim 1, wherein the wake-up circuit includes a driving switching circuit coupled to the wake-up path and the variable resistor element, wherein the driving switching circuit is configured to change an on/off state according to a change in resistance of the variable resistor element, wherein the driving switching circuit is configured to selectively enable supplying the generated wake-up power to the corresponding module BMS and to prevent the wake-up circuit from malfunctioning, and wherein the transistor includes the driving switching circuit or another circuit.

6. The battery rack managing apparatus according to claim 5, wherein the driving switching circuit is implemented with a FET.

7. The battery rack managing apparatus according to claim 1, wherein the heater includes:

the rack heater configured to be controlled by the rack BMS; and the plurality of module heaters corresponding to the plurality of module BMSs, respectively.

8. The battery rack managing apparatus according to claim 7, wherein the plurality of module heaters are configured to apply heat sequentially to the respective variable resistor elements after the rack heater generates heat.

9. The battery rack managing apparatus according to claim 7, wherein a woken-up module BMS among the plurality of module BMSs is configured to control a power supplied to the corresponding one of the plurality of module heaters.

10. The battery rack managing apparatus according to claim 7, wherein a module heater corresponding to one of the plurality of module BMSs is configured to supply heat to the variable resistor element in one of the plurality of wake-up circuits corresponding to another one of the plurality of module BMSs.

11. The battery rack managing apparatus according to claim 1, wherein each of the plurality of module heaters is configured to apply heat to the variable resistor element of one of the plurality of wake-up circuits without applying heat to the variable resistor element of an adjacent one of the plurality of wake-up circuits.

12. A battery rack, comprising the battery rack managing apparatus according to claim 1.

13. An energy storage system, comprising the battery rack managing apparatus according to claim 1.

14. The battery rack managing apparatus according to claim 1, wherein when the wake-up power circuit or a driving power circuit supplies the current toward the variable resistor element, the wake-up circuit automatically does not supply power to the corresponding module BMS, and wherein when the wake-up power circuit or the driving power circuit does not supply the current toward the variable resistor element, the wake-up circuit automatically supplies the wake-up power from the wake-up power circuit to the corresponding module BMS, without using the processor.

15. The battery rack managing apparatus according to claim 1, wherein the wake-up power circuit is not any of the battery cells.

16. The battery rack managing apparatus according to claim 1, wherein the corresponding module heater is located at an output side of the transistor, is not located at an input side of the transistor, and is located at a path parallel to the wake-up path.

17. A battery module, comprising:

a module battery management system (BMS) configured to control a charging and discharging operation of the battery module;

a heater configured to generate heat and supply the generated heat to a first variable resistor element of a first other battery module but not to a variable resistor element of the battery module; and a wake-up circuit including the variable resistor element configured to change a resistance value by heat supplied by a heater of a second other battery module, the wake-up circuit being configured to supply a wake-up signal to the module BMS to switch a mode of the module BMS between a wake-up mode and a sleep mode, if the resistance value of the variable resistor element is changed, wherein the heater of the battery module and the heater of the second other battery module are different from battery cells, wherein the battery module, the first other battery module, and the second other battery module are different from one another, and wherein the battery module and the first other battery module are adjacent to each other, wherein the wake-up circuit includes a wake-up path for supplying a wake-up power to the module BMS, wherein the wake-up circuit includes a transistor connected to the wake-up path, wherein the heater of the battery module is not located within the wake-up path, is connected to an output of the transistor, and is not connected to an input of the transistor, and wherein the transistor is not a temperature sensor.

18. The battery module of claim 17, wherein in the sleep mode, at least one of the following occurs: reducing power consumption of the module BMS, transporting the battery module, repairing one or more battery cells, or replacing a battery module.

19. The battery module of claim 17, wherein the heater of the battery module is configured to generate heat without being controlled by the module BMS of the battery module, wherein when the module BMS of the battery module wakes up, the heater of the battery module is configured to operate automatically, and wherein the heater of the battery module is configured to wake up the first other battery module so that the battery module and the first other battery module are woken up sequentially without the battery module performing a separate control operation to wake up the first other battery module.

20. The battery module of claim 17, wherein the wake-up circuit further includes an output terminal and a delay circuit, wherein the delay circuit is coupled to the output terminal of the wake-up circuit and an input terminal of the heater of the battery module, and wherein the delay circuit is configured to delay time when an operating power is supplied from the wake-up circuit to the heater of the battery module.

* * * * *